Aug. 16, 1927.

A. WEILAND

VEHICLE BUMPER

Re. 16,706

Original Filed July 10, 1925

ON LINE 3-3. FIG. 2.

Inventor

Alfred Weiland.

By Robert M. Barr

Attorney

Reissued Aug. 16, 1927. Re. 16,706

UNITED STATES PATENT OFFICE.

ALFRED WEILAND, OF NESHANIC, NEW JERSEY, ASSIGNOR TO PNEUMATIC APPLIANCES CORPORATION, OF NEW YORK, N. Y., A CORPORATION OF DELAWARE.

VEHICLE BUMPER.

Original No. 1,579,186, dated March 30, 1926, Serial No. 42,705, filed July 10, 1925. Application for reissue filed June 28, 1927. Serial No. 202,151.

The present invention relates to bumpers or buffers for protecting vehicles and absorbing or reducing impacts which otherwise would be transmitted to the vehicle, and relates more particularly to bumpers of the spring type though not being specifically so limited.

Some of the objects of the present invention are to provide an improved shock absorbing bumper; to provide means interposed between the impact receiving bar and the vehicle for reducing and absorbing impacts; to provide means for preventing a yielding impact receiving bar from bending beyond its elastic limit and thus becoming deformed; to provide a spring bumper having means to supplement the spring action to more effectively reduce an impact; to provide a spring bumper provided with pneumatic shock absorbing members; to provide a shock absorbing bumper including pneumatic members; and to provide other improvements as will hereinafter appear.

Figure 1:
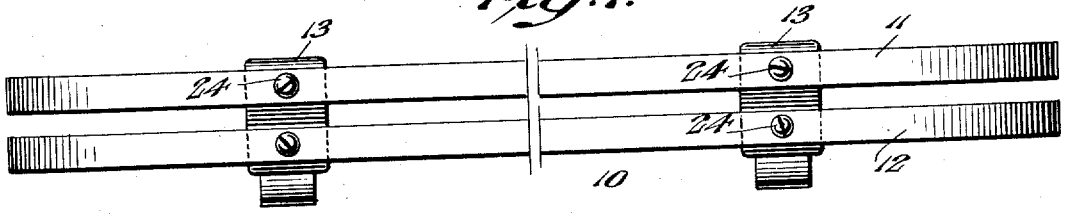
Figure 2:
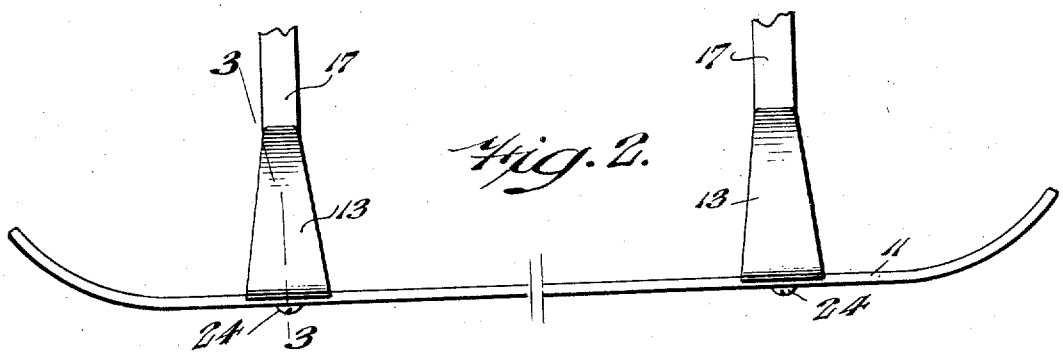
Figure 3:
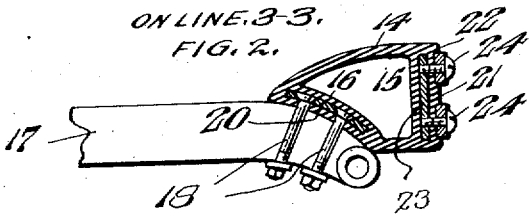
Figure 4:
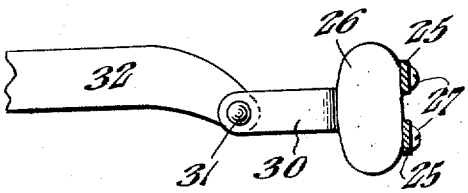

In the accompanying drawings Fig. 1 represents a front elevation of a vehicle bumper embodying one form of the present invention; Fig. 2 represents a plan of the same; Fig. 3 represents a section on line 3—3 of Fig. 2; Fig. 4 represents a side elevation in part section of another form of the invention; and Fig. 5 represents a fragmetal plan in part section of the form shown in Fig. 4.

Referring to Figs. 1, 2 and 3 of the drawings, a bumper 10 is shown comprising two bumper bars 11 and 12 arranged in superposed parallel spaced edge to edge relation and having their ends rearwardly curved or curved away from the direction of impact. These bars 11 and 12 are preferably made of spring steel of rugged construction to resist impacts of a minor nature with a minimum of flexing while yielding and absorbing these of a major nature. As shown there are two of these bumper bars as this is the preferred construction, but it will be obvious that the number of such bars is not limited to two but might be more or less without departing from the invention.

For the purpose of mounting the bars 11 and 12 to provide increased flexibility under the stresses of abnormal impacts two resilient members 13 are employed each consisting of a hollow casing 14, preferably of rubber, which is molded with its chamber 15 filled with air under a pressure predetermined to maintain the casing 14 somewhat stretched in order to reinforce the natural resistance of the casing to impact and insure a relatively quick return to its normal shape and position. Preferably one side 16 of the casing 14 is molded to conform to the end of the frame 17 and is rigidly made fast thereto by bolts 18 which have their heads molded into the casing 14 and held against tearing out by a reinforcing plate 20 also molded into and embedded in the casing 14. The front wall 21 of the casing 14 is provided with superposed parallel recesses 22 for respectively seating the bars 11 and 12 and back of these recesses is a reinforcing plate 23 molded into the wall in order to provide a rigid base for the reception of fastening screws 24 by which the bars 11 and 12 are attached to the respective members 13. In this form of the invention the flexible bumper can be attached to the frame without disturbing the usual shackle connections.

Figure 5:
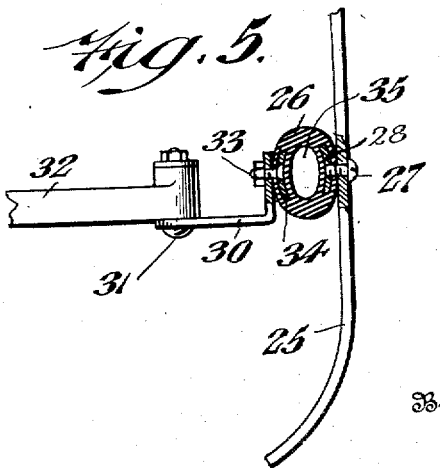

In the form of the invention shown in Figs. 4 and 5, the bumper bar or bars 25 are attached to two resilient members 26, also of hollow construction and of generally elliptical form in section, by screws 27 threaded into plates 28 embedded respectively in the front walls of the members 26. The opposite sides of the members 26 are respectively supported by hangers 30 attached respectively to the shackle bolts 31 of the frame 32. The hangers 30 have stud bolts 33 molded with reinforcing plates 34 into the rear walls of the respective members 26, and the general arrangement is such that the two resilient members are respectively between the frame bars 32 and the bumper bars 25 to function properly with the bars 25 to yieldingly resist the shock of an impact. The resilient members 26 are molded with air under a predetermined pressure in the internal chamber 35 and this is the preferred construction through generically considered the members 26 are of pneumatic construction with the air introduced in any way and not necessarily during the molding process. As here shown the walls of the members 26 are of rubber as the means for supplying the desired yielding effect to supplement the yielding of the spring bars 25.

The operation of the two forms of the invention as shown is substantially the same in that the bars 11 and 12 or 25 as formed are of spring material and capable of yielding throughout their length so that it makes no material difference whether the impact takes place at or along the body length of the bars or at the free ends. The natural rigidity of the buffer or bumper bars is such that normal and minor shocks are readily absorbed thereby so that damage to the vehicle is either prevented or reduced to a minimum. Where the bumper bars are subjected to abnormal shock, such for example as a collision between two vehicles, the impact may be sufficient to bend the bars to such an extent as to reach the elastic limit of the bar and unless a supplemental yielding is possible the bars will take a permanent set and fail to return to their normal shape. Where a shock of this character happens, the pneumatic or supplemental resilient members come into play and allow the bumper bar to yield as a whole to thereby not only materially reduce the transmitted shock but also to prevent deformation of the impact receiving bars.

It will now be apparent that a complete unitary shock absorbing bumper or buffer has been devised which can be effectively employed at either the front or rear of a vehicle, or at both ends if desired, wherein an initial impact receiving member of yielding spring material is employed and which is supplemented by a shock absorbing device interposed between the member and the rigid frame of the vehicle. Furthermore, the construction is such that the shock absorbing bar is effective to receive impacts directly from the front or from either side and its inherent properties allow it to yield and absorb all normal impacts, while the provision of a secondary absorbing means guards the bar against bending beyond its natural characteristics. In this way the impact receiving bars are always functioning to maximum efficiency and always maintain their normal effective shape.

While but two forms in which this invention may be embodied have been shown and described, it is to be understood that the same is susceptible of modification in various particulars without departing from the spirit or scope of the invention or sacrificing any of its advantages.

Having thus described my invention, I claim:

1. In combination with a vehicle frame, a bumper bar of spring material arranged to extend across an end of the vehicle, and pneumatic shock absorbing means interposed between said bar and said frame.

2. In combination with a vehicle frame, a bumper bar arranged to extend across an end of the vehicle, and pneumatic shock absorbing means connecting said bar to said vehicle.

3. In combination with a vehicle frame, a bumper bar arranged to extend across an end of the vehicle, and pneumatic shock absorbing means interposed at a plurality of points between the ends of said bar and said frame.

4. In combination with a vehicle frame, a pair of hollow resilient members carried by said frame, and a bumper supported by said members.

5. In combination with a vehicle frame, a pair of hollow resilient members carried by said frame, and a bumper bar of spring material supported by said members.

6. In combination with a vehicle frame, a pair of hollow resilient members containing compressed air carried by said frame, and a bumper bar of spring material supported by said members.

7. As a new article of manufacture, a shock absorbing bumper comprising a bumper bar, hollow resilient members attached to said bar intermediate its ends, and means for connecting said members to a part to be protected from impact.

8. As a new article of manufacture, a shock absorbing bumper comprising a pair of bumper bars of spring material, hollow resilient members attached to said bars and supporting them in superposed relation, and means for connecting said members to a part to be protected from impact.

9. A bumper comprising a bar of spring material arranged to extend across a part to be protected, means for supporting said bar on said part, and means including pneumatic members for preventing said bar from bending beyond the elastic limit of its material.

10. An automobile bumper comprising an impact member and a support member, and a rubber block forming means for securing said members together.

11. A vehicle bumper comprising an impact member, a support member, and a block of resilient material adapted to cushion the impact member, one portion of the block being anchored to the impact member and another portion being anchored to the support member.

12. A vehicle bumper comprising an impact member, a support member, and a rubber block adapted to cushion said impact member; one portion of said block being anchored to the impact member and another portion being anchored to the support member.

Signed at New York, county of New York and State of New York, this 7th day of June, 1927.

ALFRED WEILAND.